UNITED STATES PATENT OFFICE 2,543,601

POLYMERIC IMIDO-ESTERS PREPARED FROM MALEIC HETEROPOLYMERS AND AZOLINES

Stanley P. Rowland, Philadelphia, Pa., assignor to Rohm & Haas Company, Philadelphia, Pa., a corporation of Delaware No Drawing. Application December 6, 1949, Serial No. 131,518

12 Claims. (Cl. 260—78.5)

This invention relates to a new class of resinous materials and to a process for preparing them.

The products of this invention are polymeric, resinous imido-esters and they are made by chemically reacting a heteropolymer of maleic anhydride and a polymerizable, vinylidene compound containing a single vinylidene group, $>C=CH_2$, with an oxazoline or a thiazoline. Reaction takes place between the azoline, that is the oxazoline or thiazoline, and the anhydride groups in the heteropolymer. It is known that in a heteropolymer of maleic anhydride and a vinylidene compound containing a single vinylidene group there are free anhydride groups along the polymeric chain and that the number of these is proportional to the amounts of maleic anhydride and the copolymerizable monovinylidene compound which are polymerized together. When, to take a convenient example, equimolar amounts of styrene and maleic anhydride are copolymerized, the styrene and maleic portions alternate in the chain of the copolymer. Thus in this example, which is limited to a styrene heteropolymer but which is typical of the heteropolymers or copolymers of maleic anhydride and the other monovinylidene compounds, the heteropolymer is made up of recurring units, each of which has the following structure:

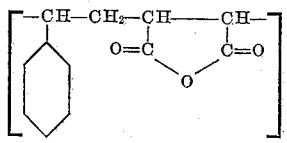

By the process of this invention, the azoline, which has a skeletal structure,

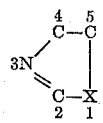

in which X is an oxygen atom in the case of azolines and a sulfur atom in the case of thiazolines, reacts with the anhydride portion of the heteropolymer according to this equation

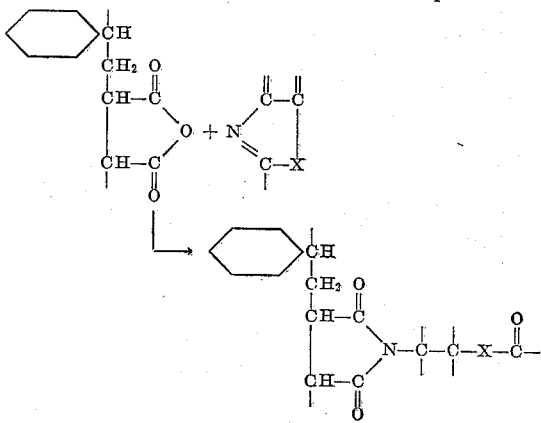

This reaction may be better understood from the following equation which represents the reaction between one unit of a styrene-maleic anhydride heteropolymer and 2-heptadecadienyl-5-methyl oxazoline:

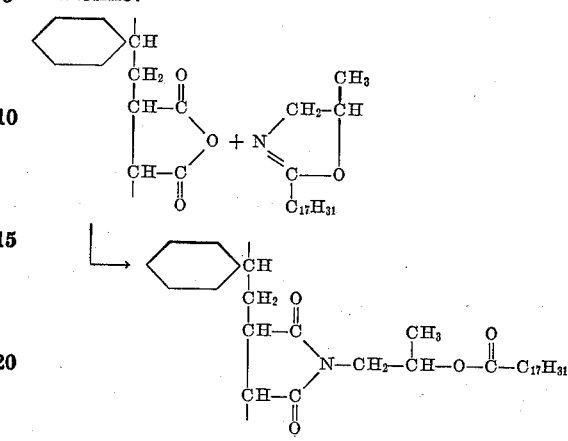

The product in this case is identified as polystyrene-succinimido-isopropyl linoleate. This particular heteropolymer is especially unique in that the unsaturation of the $—C_{17}H_{31}$ radical imparts oxidizing and additional polymerizing properties to it.

The heteropolymers of maleic anhydride and the monovinylidene compounds are well known and are readily prepared by heating maleic anhydride and one or more monovinylidene compounds, preferably in the presence of a peroxidic catalyst. Their preparation is shown for example in U. S. Patents Nos. 2,047,398 to Voss et al., 2,286,062 to Condo et al. and 2,320,724 to Gerhart et al., to which patents reference is hereby made.

The monovinylidene compounds all contain a single vinylidene group, $>C=CH_2$, and all are capable of polymerizing alone and/or copolymerizing with maleic anhydride to form thermoplastic polymers which are soluble in organic solvents. Typical monovinylidene compounds which copolymerize with maleic anhydride to form heteropolymers, which in turn react by the process of this invention with azolines, include the following: vinyl halides such as vinyl chloride and vinyl bromide; vinyl ethers such as methyl vinyl ether, naphthyl vinyl ether, phenyl vinyl ether, cyclohexyl vinyl ether, isopropyl vinyl ether; vinyl hydrocarbons such as styrene and vinyl naphthalene; heterocyclic compounds such as vinyl pyridine and vinyl carbazole; vinyl esters such as vinyl acetate and vinyl proprionate; esters of acrylic and methacrylic acids such as ethyl acrylate, methyl methacrylate, butyl acrylate, octyl methacrylate; acrylonitrile; methacrylonitrile; acrylamide and methacrylamides; acrylic acid and methacrylic acid; methyl vinyl ketone; isopropyl vinyl ketone; allyl esters and methallyl esters of monocarboxylic acids such as allyl stearate and methallyl acetate; and the like. The azolines react with the acid anhydride portion of the heteropolymer and the remainder of the so-called "unit" in the polymeric chain does not take part in the reaction with the azoline although it necessarily contributes to the physical properies of the final polymeric imido-ester. Azolines react likewise with the heteropolymers of maleic anhydride and more than one monovinylidene compound as for example with a heteropolymer of maleic anhydride, styrene and acrylonitrile.

The physical properties of the heteropolymers depend on the particular monovinylidene compounds which are copolymerized with the maleic anhydride and on the ratio of the two copolymerizable compounds, but the physical properties of the heteropolymer do not apparently affect the reaction of the heteropolymers with the azolines, which is the process of this invention. In all cases however the heteropolymers must be thermoplastic and soluble in an organic solvent such as toluene, xylene, acetone or dioxane. The heteropolymers should also contain from about 5% to about 50% copolymerized maleic anhydride on a molar basis. This assures that the heteropolymer contain sufficient anhydride groups for reactivity with the azolines.

The heteropolymers of styrene and maleic at present show the greatest promise particularly in view of their low cost, availability and speedy reaction with azolines. Such polymers, ranging from the "tetramer" of average molecular weight around 800 to those of molecular weight at least as high as 30,000, have been reacted with a very large variety of oxazolines and thiazolines and have given rise to entirely new kinds of resinous imido-esters.

The oxazolines and thiazolines which react with the maleic anhydride heteropolymers are themselves also well known, although it was not known heretofore to make new resins by reacting these azolines with the heteropolymers. All of the reactive azolines have the general formula

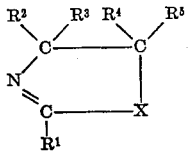

in which X is an atom of sulfur or oxygen, the characters $R^2$, $R^3$, $R^4$ and $R^5$ represent hydrogen atoms or monovalent, organic radicals which are free of alcoholic hydroxyl groups or amino-hydrogen atoms, and which preferably are hydrocarbon groups, and in which $R^1$ also represents the same kind of monovalent, organic radicals as do R's $^2$ to $^5$ but does not represent a hydrogen atom.

The organic radicals which are represented by R's $^1$ to $^5$ must be unreactive with acid anhydrides. Whether a particular substituent is reactive with acid anhydrides is well within the knowledge of one skilled in chemistry. That is, they must be entirely free of such substituents as hydroxy groups and amino hydrogen atoms which are capable of reacting with acid anhydrides, so that no interfering side-reactions can take place. It it preferred that these radicals be hydrocarbon radicals such as alkyl, aryl, alkaryl, aralkyl and cycloalkyl groups. The following list includes examples of such suitable, hydrocarbon radicals: methyl, ethyl, isopropyl, sec.-butyl, tert.-amyl, 2-ethylhexyl, lauryl, n-tetradecyl and octadecyl groups and the isomers of these groups; phenyl, tolyl, benzyl, p-octylphenyl, m-xylyl, 2,4-di-tert.-amyl phenyl; cyclohexyl; and naphthyl groups. In addition, the hydrocarbon group which is represented by $R^1$ can be unsaturated. In fact a particularly valuable group of products are those in which $R^1$ is unsaturated. Such products have the added advantage of being more reactive and subject to oxidation and polymerization due to their unsaturation.

Although those reactants are preferred in which the substituents represented by the R's are hydrocarbons, it is a fact that the products of this invention are readily prepared from the heteropolymers and oxazolines or thiazolines in which the substituents R's $^1$ to $^5$ also contain other elements in addition to carbon and hydrogen. Such substituents must be inert in the sense that they do not undergo reaction themselves with acid anhydrides. Thus, halogen groups may be present on the R-substituents as well as nitro, ether, keto, aldehydo, sulfonic, carboxyl, or tertiary-amino groups.

A large class of operable oxazolines and thiazolines are known and are shown in the literature. All of these react with the above-described copolymers by the methods set forth in the examples below. All that is required is to substitute an equivalent amount of one azoline; i. e. an oxazoline or a thiazoline, for the particular azolines shown in the examples. Thus in the same manner, the following azolines, of which the skeletal structure is

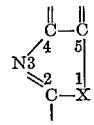

and in which X is an oxygen atom in oxazolines or a sulfur atom in thiazolines, combine in equimolecular amounts with the anhydride groups in maleic anhydride copolymers to form the new resinous products of this invention: 2-phenyl azolines; 2-p-tolyl azolines; 2-o-tolyl azolines; 2-benzyl azolines; 2-(o-, m-, and p-nitrophenyl) azolines; p-chlorobenzyl azolines; 2-undecyl-5-chloromethyl azolines; 2,4-diphenyl azolines; 2,5-diphenyl azolines; 2-phenyl-5-chloromethyl azolines; 2 - (p - nitrophenyl) - 5 - chloromethyl azolines; 2 - (p - nitrophenyl) - 5 - diethylaminomethyl azolines; 2-(p-nitrophenyl)-5-dibutylaminomethyl azolines; 2 - phenyl - 5,5 - dimethyl azolines; 2-phenyl-5-phenyl-5-methyl azolines; 2-(m- and p-nitrophenyl)-5,5-dimethyl azolines; 2-(α- or β-naphthyl) azolines; 2-p-methoxyphenyl azolines; 2-p-ethoxyphenyl azolines; 2-p-butyloxyphenyl azolines; 2-(m-nitro-p-methoxyphenyl) azolines; 2-(p-nitrophenyl)-4-butyl azolines; 2-(p-nitrophenyl)-4-phenyl azolines; 2-phenyl-5-methyl azolines; 2-phenyl-5-ethyl azolines; 2-benzyl-5-methyl azolines; 2-styryl-5-methyl azolines; 2-(o- and p-tolyl)-5-methyl azolines; 2-(α and β-naphthyl)-5-methyl azolines; 2-phenyl-4,5-dimethyl azolines; 2-(p-nitrophenyl)-4,5-dimethyl azolines; 2-phenyl-4-methyl-5-ethyl azolines; 2,4,5-trimethyl azolines; 2-undecyl-4,4-dimethyl azolines; 2-phenyl-4-methyl-4-ethyl azolines; 2-phenyl-4,4-dimethyl azolines; 2-heptadecyl azolines; 2-heptadecenyl azolines; 2-heptadecyl-4,4-dimethyl azolines; 2-heptadecenyl-5-ethyl azolines; 2-phenyl-4-methyl-5-phenyl azolines; 2-methyl-4,5,5-triphenyl azolines; 2-phenyl-4-methyl-5,5-dibenzyl azolines; 2-heptadecyl-5-diethylaminomethyl azolines; 2-heptadecyl-5-ethyl azolines; 2-heptadecenyl-4,5,5-trimethyl azolines; 2,4,5-triisobuyl azolines; 2-heptadecyl-4,4,5,5-tetramethyl azolines; 2-methyl-4-isoamyl-4-methyl azolines; 2-heptadecyl-4-propyl-5-methyl azolines; 2-heptadecenyl-4,4-dimethyl-5-isopropyl azolines; 2-decyl-4,4-dibutyl-5-methyl azolines; and 2-heptadecyl-5-methyl-5-ethyl azolines.

The reaction between the azolines and the heteropolymers takes place fairly readily and often exothermically. Reaction takes place even at room temperature (ca. 20° C.) especially when a copolymer and an azoline are dissolved in a volatile solvent and are deposited as a thin air-drying film. Heating of the reactancts accelerates the rate of reaction and for this reason a minimum temperature of 50° C. is recommended. Temperatures up to 300° C. are operable but at the higher temperatures by-products and gels are frequently formed. Accordingly, an upper temperature of 250° C. is much preferred. When the resinous product is to be isolated in bulk, the reactants are combined in a reactor; but this is not always necessary. For example, a mixture of the reactants, preferably in solution, can be applied to the surface of an object which it is desired to coat and protect, and the coated object can then be baked in an oven. During the baking period, the reactants combine to form the new polymeric product as a firm coating on the object. This procedure is especially effective in those cases where the azoline contains an unsaturated, long-chain substituent in the 2-position ($R^1$). For convenience in carrying out the reaction, inert solvents can be employed. Likewise catalysts, such as alcoholates, zinc chloride and the like can be used, although ordinarily the reaction takes place rapidly enough in the absence of catalysts. Other expedients well known to those skilled in the art, such as variations in pressure, solvent-extraction of the product, excess of one reactant, and the like, can be used without departing from the spirit of the invention.

It is evident from the equations above, which are confined for convenience to styrene-maleic copolymers but which are typical of the reaction of the other heteropolymers, that one molecule of azoline combines with one anhydride group in the heteropolymer of maleic anhydride and monovinyl compound. The course of the reaction therefore is readily followed by titrating the reaction mixture with standard alkali since the alkali neutralizes the free and unreacted anhydride groups. Such is a conventional method of determining the acid number of resinous materials. As the reaction progresses by combination of the azoline and the anhydride groups in the heteropolymer, the acid number of the resin decreases, and at the same time the solubility of the resin in hydrocarbons increases. In some instances it is desirable to employ less than enough azoline to react with all of the anhydride groups, and when such is the case the unreacted anhydride groups can readily be converted to salts, for example, by neutralization, or to esters by reaction with alcohols. Alternatively some of the anhydride groups can be neutralized or esterified first and the remainder then reacted with the azoline.

The following examples are presented in order to illustrate—and not to limit—this invention. The reaction of the oxazolines and thiazolines with the heteropolymers of maleic anhydride and monovinylidene compounds is ordinarily substantially complete after two to four hours of heating at about 150° C. to about 200° C. The reaction provides a large class of new resins differing in degree from one another as to the ratio of maleic anhydride to monovinylidene compound and as regards the kind of copolymerized monovinylidene compound and finally as regards the substituents, R's $^1$ to $^5$ on the azoline. All of the azolines, however, react in the same way provided they are free of substituent groups which react with acid anhydrides, particularly alcoholic hydroxyl groups and amino-hydrogen atoms; and one azoline can be substituted for another in the processes set forth in the following examples.

Example 1

A heteropolymer of maleic anhydride and styrene was prepared by heating one gram-mole of each dissolved in 606 grams of acetone for 5.5 hours at 60° C. in the presence of 2 grams of benzoyl peroxide. This polymer had a relatively high molecular weight of the order of 20,000. To 128 grams of the resultant acetone solution (equivalent to 32 grams of heteropolymer) was added 56 grams of 2-heptadecenyl-5-methyl oxazoline, and this reaction mixture was refluxed for 1.5 hours. Then 182 grams of xylene was added and the temperature was raised gradually to 140° C., during which period the acetone was removed and was replaced as solvent by the xylene. The resulting 15% resinous solution of polystyrene-succinimidoisopropyl oleate was clear and had a viscosity of 6.3 poises when measured at 25° C.

Example 2

A heteropolymer of relatively low molecular weight (ca. 2000) was made by heating for 5 hours at refluxing temperature a mixture of 730 grams of maleic anhydride, 775 grams of styrene, 57.2 grams of amyl mercaptan, 15 grams of benzoyl peroxide and 2258 grams of dioxane. To 268.5 grams of the resultant solution of heteropolymer was added 189.5 grams of 2-heptadecadienyl-5-methyl oxazoline. The solution was heated and the dioxane was removed by distillation up to a temperature of 180° C. The residue was heated at 185° C. for an additional three hours at which time mineral thinner was added and the resultant solution was cooled to room temperature. The acid number of the resin was 6.1, and a 40% solution of resin had a viscosity of 2 poises when measured at 25° C.

Cobalt naphthenate in an amount equal to .05% cobalt metal based on the resin was added to the resinous solution. Films thereof on glass plates dried rapidly (set time=35 minutes; tack-free time=8-12 hours) and formed hard, tough and alkali-resistant films.

Example 3

A styrene-maleic copolymer of intermediate molecular weight (ca. 5600) was made by heating at the refluxing temperature for 5 hours a mixture of 1 part by weight of maleic anhydride, 1.06 parts of styrene, 3.1 parts of dioxane and 1% benzoyl and 2% amyl mercaptan based on the styrene and maleic anhydride. To one part of the resultant solution of heteropolymer was added 0.727 part of 2-heptadecadienyl-4,4-dimethyl oxazoline. The temperature was gradually raised to 200° C. during which time the dioxane was distilled off. After the removal of the dioxane, the temperature was maintained at 200° C. for 5 hours. Thereafter the pressure was reduced to 2 mm. (Hg) and all volatile material was removed at 200° C. The resin had an acid number of 3.2 which was then diluted to 40% with xylene. This solution had a viscosity of 10 poises at 25° C. Films of the new resinous product (2-polystyrene-succinimido-2,2,dimethyl ethyl linoleate) which were baked at 150° C. for 1 hour were extremely hard, tough and alkali-resistant as were other films containing 0.05% cobalt (as naphthenate) which were air-dried for 48 hours.

*Example 4*

One part of the solution of styrene-maleic copolymer prepared by the process described in Example 3 above was combined with 0.2 part of 2-methyl thiazoline by heating the reactants in a pressure-reactor at 180° C. for 4 hours. In this period of time 82% of the thiazoline had reacted as indicated by the fact that the product had an acid number of 34.

*Examples 5–16*

A styrene-maleic anhydride heteropolymer was prepared by the process described above in Example 2. Portions of this polymer were then reacted, by the procedure described in Example 2, with the following azolines:

2-heptadecyl-4,4-dimethyl oxazoline
2-heptadecyl oxazoline
2-heptadecyl thiazoline
2-heptadecenyl oxazoline
2-heptadecenyl thiazoline
2-heptoxymethyl-5,5-dimethyl oxazoline
2-heptoxymethyl-5,5-dimethyl thiazoline
2-phenyl-4,4-dimethyl oxazoline
2-(1-ethylpentyl)-5-methyl oxazoline
2-(1-ethylpentyl)-5-methyl thiazoline
2-heptadecadienyl-5-methyl oxazoline (from isopropanol amine and the fatty acids of dehydrated castor oil)
2-heptadecadienyl-5-methyl thiazoline.

In every instance the reaction was straight forward and the imido-ester derivative of the heteropolymer was formed in accordance with the general equation for the reaction which is given above. In every instance the acid number of the final product was below 9 indicating that substantially complete reaction had taken place.

All of these new resinous materials were flowed, as solutions, on glass plates and then baked for one hour at 150° C. and in every case the resultant film was clear, hard, adhesive and tough. In contrast a film of the copolymer, per se, without having been reacted with an azoline was clear but was discontinuous, extremely brittle and decidedly lacking in adhesion.

While the above examples are all confined to the reactions of heteropolymers of maleic anhydride and styrene it is evident from the following examples and a comparison of them with the foregoing that the heteropolymers of maleic anhydride and the other monovinylidene compounds react in the same way.

*Examples 17–18*

To 128 grams of a 25% solution of a heteropolymer of one mole each of maleic anhydride and 2-ethylhexyl vinyl ether in benzene was added 56 grams of 2-(8-heptadecenyl)-5-methyl oxazoline. A current of nitrogen gas was passed over the surface of this solution while the benzene was distilled off. Then the temperature was raised to 150° C. and held there for 2 hours. The viscous, resinous product had an acid number below 5. A 70% solution of the resin in mineral thinner had a viscosity of 8.8 poises at 25° C.

In the identical manner as that described in the preceding paragraph 2-heptadecyl-5-methyl oxazoline was reacted with the heteropolymer of maleic anhydride and 2-ethylhexyl vinyl ether. The resultant resin had a viscosity of 5.5 poises when measured at 25° C. as a 70% solution in mineral thinner. Moreover this product was soluble in lubricating oils.

*Example 19*

To a 55.4% solution in xylene of the heteropolymer of maleic anhydride and allyl stearate (in equimolar amounts) was added 7.8 grams of 2-"heptadecadienyl"-5-methyl oxazoline (derived from soybean oil fatty acids which were predominantly linoleic acid). The temperature was raised to 180° C. and the xylene was distilled off while a stream of carbon dioxide was passed over the reaction mixture. After 2 hours at 180° C., the resin which had an acid number of 8.2 was cooled and dissolved in mineral spirits. A seventy percent solution of the product had a viscosity of 32 poises. A film of this resin, containing 0.05% cobalt as the naphthenate, was dry and had a pencil hardness of 3B, after being baked for 45 minutes at 150° C.

*Example 20*

2-heptadecenyl oxazoline (152 grams) and 92 grams of a heteropolymer of equimolar amounts of maleic anhydride and methallyl methyl ether were combined by heat at 180° C., under a blanket of carbon dioxide. The resin which had an acid number of 3.0 was diluted with xylene to a solids-content of 70%. This solution which had a viscosity of 2.5 poises was mixed with a solution of ½ second nitrocellulose so that the ratio of solid nitrocellulose to imido-ester was 4 to 1. The baked film had a pencil-hardness of 8H which was the same as that of a film of the unmodified nitrocellulose but in addition the modified film was much more flexible.

*Example 21*

One part by weight of a heteropolymer prepared from equimolar amounts of isopropyl vinyl ether and maleic anhydride was combined with 1.9 parts of 2-heptadecadienyl-4,4-dimethyl oxazoline in 3.16 parts of acetone. The solution was heated to refluxing temperature and 2.9 parts of xylene was added after which the temperature was gradually raised to 140° C. while the acetone distilled off. After a heating period of three hours at 140° C., the solution was cooled. The resultant solution containing 50% polymer imido-ester had a viscosity of 2.5 poises. A film of this resin after being baked one half hour at 300° F. was relatively soft (pencil hardness of 5B) but was completely insoluble in acetone and xylene.

*Example 22*

By the procedure of Example 20, 400 grams of a 25% solution in xylene of a vinyl cyclohexene-maleic heteropolymer was reacted with 170 grams of 2-heptadecadienyl oxazoline. After a two hour period of heating at 180° C., the reaction mixture was diluted with xylene to a solids-content of 45%. The viscosity of this solution was 24 poises. A film of the resin, containing 0.05% cobalt (as naphthenate) was tack-free in about 10 minutes and was dry and moderately resistant to xylene and acetone in 5 hours. A film of the resin (no drier) was completely insoluble in acetone and xylene after being baked one half hour at 150° C.

Examples 23–29

New film-forming resins were prepared by reacting the following combinations of maleic anhydride heteropolymers and azolines. In every instance the resultant products differed markedly from the unmodified heteropolymers, particularly in regards to the physical properties of films of the products when employed as surface-coatings:

| Heteropolymer | Azoline |
|---|---|
| Vinyl acetate-maleic anhydride (1 mole:1 mole). | 2-(2,4,4 trimethylpentyl)-5-methyl oxazoline. |
| Vinyl acetate-maleic anhydride (1 mole:1 mole). | 2-phenyl-4,4-dimethyl oxazoline. |
| Ethyl acrylate-maleic anhydride (1:1). | 2-(1-ethylpentyl)-5-methyl oxazoline. |
| Methyl methacrylate-maleic anhydride (1:0.74). | 2-heptadecadienyl-5-methyl oxazoline. |
| Methyl methacrylate-maleic anhydride (1:0.74). | 2-heptoxymethyl-5,5-dimethyl oxazoline. |
| Acrylonitrile-maleic anhydride (1:0.054). | 2-undecyl oxazoline. |

Although the above discussion and examples are limited to the combination of azolines with heteropolymers of maleic anhydride it must be pointed out that copolymers of monovinylidene compounds and the anhydrides of citraconic and itaconic acids also react with oxazolines and thiazolines to form polymeric imido-esters in a like manner. Furthermore the thiazolines react in the same way as the oxazolines.

The products of this invention are all polymeric and accordingly are presently most valuable as plastics and surface coatings. Many are soluble in mineral oils and especially those which contain sulfur by virtue of having been made from thiazolines have marked effects as lube-oil additives.

I claim:

1. A process for the preparation of a polymeric imido-ester which comprises chemically reacting, at a temperature from 20° C. to 300° C., a thermoplastic heteropolymer of maleic anhydride and a monovinylidene compound with an azoline of the general formula

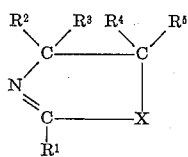

in which X represents an atom of an element from the class consisting of oxygen and sulfur; $R^2$, $R^3$, $R^4$, and $R^5$ represent members of the class consisting of hydrogen atoms and alkyl, aryl, alkaryl, aralkyl and cycloalkyl groups; and $R^1$ represents a monovalent hydrocarbon radical.

2. A process for the preparation of a polymeric imido-ester which comprises chemically reacting, at a temperature from 20° C. to 300° C., a thermoplastic heteropolymer of maleic anhydride and a monovinylidene compound with an azoline of the general formula

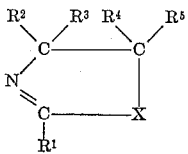

in which X represents an atom of an element from the class consisting of oxygen and sulfur; $R^2$, $R^3$, $R^4$ and $R^5$ represent members of the class consisting of hydrogen atoms and alkyl, aryl, alkaryl, aralkyl and cycloalkyl groups; and $R^1$ represents a monovalent hydrocarbon radical, said heteropolymer containing from about 5% to about 50% of copolymerized maleic anhydride on a molar basis.

3. A process for the preparation of a resinous product which comprises chemically reacting, at a temperature from 20° C. to 300° C., a thermoplastic heteropolymer of styrene and maleic anhydride with an azoline of the general formula

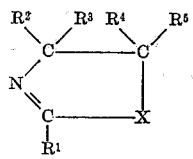

in which X represents an atom of an element from the class consisting of oxygen and sulfur; $R^2$, $R^3$, $R^4$ and $R^5$ represent members of the class consisting of hydrogen atoms and alkyl, aryl, alkaryl, aralkyl and cycloalkyl groups; and $R^1$ represents a monovalent hydrocarbon radical.

4. A process for the preparation of a resinous product which comprises chemically reacting, at a temperature from 20° C. to 250° C., (1) a thermoplastic heteropolymer of about 95% to 50% styrene and about 5% to 50% maleic anhydride, on a molar basis, said heteropolymer having a molecular weight of about 800 to 30,000 as measured ebullioscopically in acetone; with (2) an azoline of the general formula

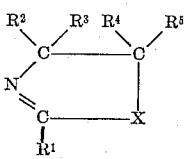

in which X represents an atom of an element from the class consisting of oxygen and sulfur; $R^2$, $R^3$, $R^4$ and $R^5$ represent members of the class consisting of hydrogen atoms and alkyl, aryl, alkaryl, aralkyl, and cycloalkyl groups; and $R^1$ represents a monovalent hydrocarbon radical.

5. A process for the preparation of a resinous product which comprises chemically reacting at a temperature from 20° C. to 250° C., a thermoplastic heteropolymer of about 95% to 50% styrene and about 5% to 50% maleic anhydride, on a molar basis, said heteropolymer having a molecular weight of about 800 to 30,000, as measured ebullioscopically in acetone, with 2-heptadecenyl oxazoline.

6. A process for the preparation of a resinous product which comprises chemically reacting at a temperature from 20° C. to 250° C., a thermoplastic heteropolymer of about 95% to 50% styrene and about 5% to 50% maleic anhydride, on a molar basis, said heteropolymer having a molecular weight of about 800 to 30,000, as measured ebullioscopically in acetone, with 2-heptadecadienyl-5-methyl oxazoline.

7. A process for the preparation of a resinous product which comprises chemically reacting at a temperature from 20° C. to 250° C., a thermoplastic heteropolymer of about 95% to 50% styrene and about 5% to 50% maleic anhydride, on a molar basis, said heteropolymer having a molecular weight of about 800 to 30,000, as measured ebullioscopically in acetone, with 2-heptadecadienyl thiazoline.

8. A resinous composition of matter as prepared by the process of claim 1.

9. A resinous composition of matter as prepared by the process of claim 3.

10. A resinous composition of matter as prepared by the process of claim 5.

11. A resinous composition of matter as prepared by the process of claim 6.

12. A resinous composition of matter as prepared by the process of claim 7.

STANLEY P. ROWLAND.

REFERENCES CITED

The following references are of record in the file of this patent:

UNITED STATES PATENTS

| Number | Name | Date |
|---|---|---|
| 2,279,410 | Nadeau et al. | Apr. 14, 1942 |
| 2,301,356 | Arnold | Nov. 10, 1942 |
| 2,370,943 | Dietrich | Mar. 6, 1945 |

FOREIGN PATENTS

| Number | Country | Date |
|---|---|---|
| 479,838 | Great Britain | Feb. 11, 1938 |